(12) United States Patent
Gharachorloo et al.

(10) Patent No.: US 9,489,698 B2
(45) Date of Patent: Nov. 8, 2016

(54) MEDIA CONTENT RECOMMENDATIONS BASED ON SOCIAL NETWORK RELATIONSHIP

(75) Inventors: Nader Gharachorloo, Ossining, NY (US); Afshin Moshrefi, Newburyport, MA (US); Azim Nasir, Foxboro, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 128 days.

(21) Appl. No.: 13/248,147

(22) Filed: Sep. 29, 2011

(65) Prior Publication Data

US 2013/0086159 A1   Apr. 4, 2013

(51) Int. Cl.
| | |
|---|---|
| *G06F 21/62* | (2013.01) |
| *G06Q 50/00* | (2012.01) |
| *G06F 17/30* | (2006.01) |
| *H04N 5/445* | (2011.01) |

(52) U.S. Cl.
CPC ......... *G06Q 50/01* (2013.01); *G06F 17/30038* (2013.01); *G06F 21/6218* (2013.01); *H04N 5/44543* (2013.01)

(58) Field of Classification Search
CPC .. H04L 67/22; H04L 65/4084; H04L 41/509
USPC ............... 709/203, 204, 205, 223, 224, 226
See application file for complete search history.

(56) References Cited

U.S. PATENT DOCUMENTS

| | | | | |
|---|---|---|---|---|
| 8,819,134 | B2 * | 8/2014 | Ham et al. ..................... | 709/204 |
| 8,984,072 | B2 * | 3/2015 | Sadja et al. ................... | 709/206 |
| 2009/0133069 | A1 * | 5/2009 | Conness ............ | H04N 5/44543 725/46 |
| 2009/0133070 | A1 * | 5/2009 | Hamano ............. | G06F 21/6218 725/46 |
| 2009/0222517 | A1 * | 9/2009 | Kalofonos ............. | G06Q 10/10 709/204 |
| 2010/0158622 | A1 * | 6/2010 | Kaufmann ............. | B23B 27/04 407/107 |
| 2011/0047213 | A1 * | 2/2011 | Manuel .................. | G06Q 30/00 709/204 |
| 2011/0067050 | A1 * | 3/2011 | Samboursky ...... | H04N 7/17318 725/30 |
| 2011/0178769 | A1 * | 7/2011 | Hunt ...................... | G06Q 30/02 702/182 |
| 2011/0296465 | A1 * | 12/2011 | Krishnan ........... | H04N 21/4355 725/51 |
| 2011/0314030 | A1 * | 12/2011 | Burba et al. ................... | 707/749 |
| 2012/0030135 | A1 * | 2/2012 | Weiss et al. .................. | 705/347 |
| 2012/0030587 | A1 * | 2/2012 | Ketkar ............. | G06F 17/30038 715/751 |
| 2012/0117163 | A1 * | 5/2012 | Lester ............... | G06F 17/30371 709/206 |
| 2012/0117167 | A1 * | 5/2012 | Sadja et al. .................... | 709/206 |
| 2012/0158622 | A1 * | 6/2012 | Mital et al. ..................... | 706/12 |
| 2012/0278127 | A1 * | 11/2012 | Kirakosyan ........ | G06Q 30/0631 705/7.29 |
| 2012/0311633 | A1 * | 12/2012 | Mandrekar ............ | H04N 5/445 725/40 |

* cited by examiner

*Primary Examiner* — Barbara Burgess

(57) ABSTRACT

A system includes a plurality of media content processing devices, a content server, and a recommendation server. Each media content processing device is configured to receive media content from a content provider. The content server is configured to provide the media content to each of the media content processing devices. The recommendation server is configured to collect viewing data from each of the media content processing device. The recommendation server is further configured to provide each media content processing device with a viewing recommendation based at least in part on the viewing data collected from one or more of the other media content processing devices and a social network relationship between at least two of the media content processing devices.

20 Claims, 4 Drawing Sheets

MEDIA CONTENT RECOMMENDATIONS BASED ON SOCIAL NETWORK RELATIONSHIP

BACKGROUND

Content providers use audience measurement systems to estimate the size of an audience that watches a media content instance such as a particular television show or movie. These audience measurement systems sample the viewing habits of a subset of a population to estimate the number of people or households in the population that viewed a particular media content instance. This information is important to advertisers who are generally willing to pay more to advertise during media content instances that have larger audiences. In addition, this information may be published so that consumers know which media content instances are popular among the population.

DETAILED DESCRIPTION

An example system includes a plurality of media content processing devices, a content server, and a recommendation server. Each media content processing device is configured to receive media content from a content provider. The content server is configured to provide the media content to each of the media content processing devices. The recommendation server is configured to collect viewing data from each of the media content processing device and to provide each media content processing device with a viewing recommendation based at least in part on the viewing data collected and a social network relationship between at least two of the media content processing devices.

An example recommendation server includes a network interface device configured to communicate with the media content processing devices and a data aggregator configured to collect viewing data and social network information from each media content processing device. The recommendation server further includes an analysis module in communication with the data aggregator and the network interface device. The analysis module is configured to analyze the viewing data and the social network information and output a viewing recommendation to each media content processing device based at least in part on the social network relationships defined by the social network information.

An example media content processing device includes a social network application configured to retrieve social network information from a social network source and a recommendation application configured to receive a viewing recommendation from the recommendation server. Again, the viewing recommendation is based at least in part on the social network information.

An example method includes collecting viewing data from a plurality of media content processing devices, including a target device and a source device, receiving social media information from a social network source, and generating a viewing recommendation for the target device based at least in part on the viewing data of the source device and the social network information. As mentioned above, the social network information defines a social network relationship between the target device and the source device.

The system may take many different forms and include multiple and/or alternate components and facilities. While an example system is shown in the figures, the example components illustrated in the figures are not intended to be limiting. Indeed, additional or alternative components and/or implementations may be used.

Figure 1:
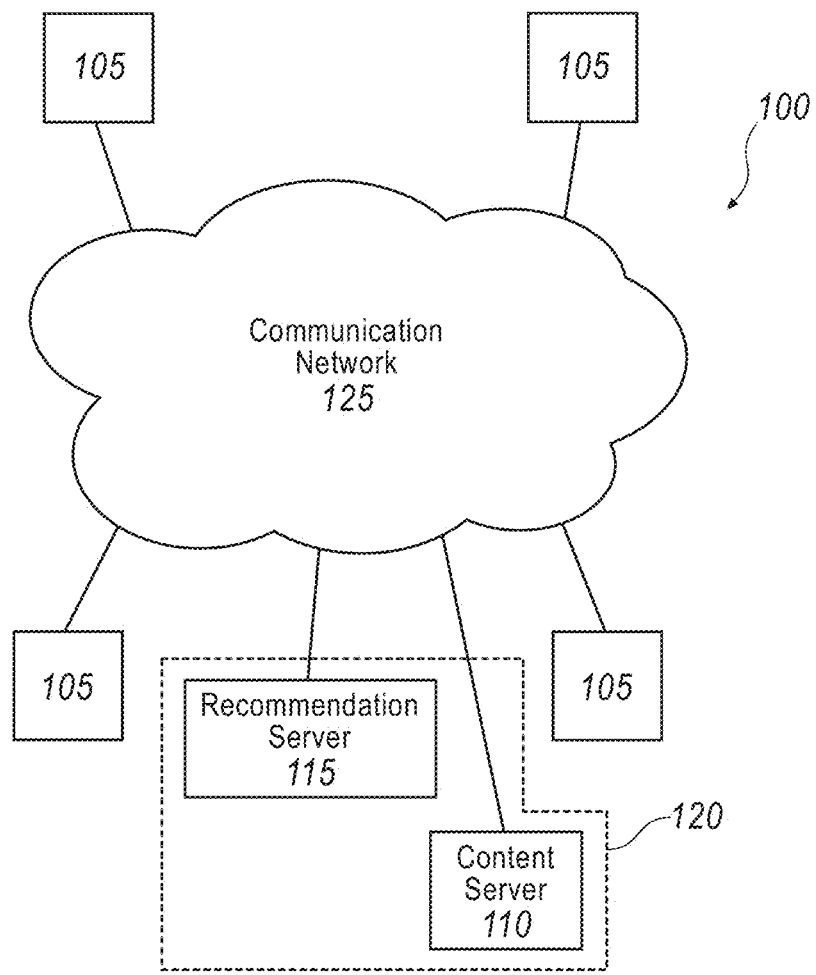
FIG. 1 illustrates an example system having a recommendation server configured to provide viewing recommendations based on viewing data and social network relationships.

FIG. 1 illustrates an example system 100 having a plurality of media content processing devices 105 located at multiple customer locations and a content server 110 and a recommendation server 115, both of which may be located at a content provider location 120. The media content processing devices 105, the content server 110, and the recommendation server 115 may communicate with one another over a communication network 125, such as a computer network or a telecommunication network 125. Communication over the communication network 125 may include any combination of wired or wireless forms of communication. For example, communication may be by cable, optical fibers, cellular towers, etc.

Each media content processing device 105 may include any number of devices configured to receive media content over the communication network 125. Example media content may include television shows, movies, streaming video or music, games, etc. In one possible approach, the media content is provided to each media content processing device 105 through one or more content providers, such as a website, a content subscription service, a cable television provider, and the like. As discussed below, the media content processing device 105 may be configured to transmit viewing data and social network information to the recommendation server 115.

The viewing data may include information about content that a user of the media content processing device 105 views. For instance, the viewing data may include information about the television shows, movies, streaming videos, streaming music, games, etc., watched or purchased by a user using the media content processing device 105. The viewing data may further include any input commands provided by the user to the media content processing device 105 via, e.g., a remote control, keyboard, touchscreen, or other input device. Therefore, the viewing data may reflect when the particular user watches media content, the amount of time the user spends on each channel (e.g., whether the user is watching a program or flipping through channels), whether the user selected a specific channel or stopped on a specific channel while flipping, whether the user changes the channel during a commercial, search queries entered by the user, and the like.

The social network information may include information that defines a social network relationship between a user of one media content processing device 105 (e.g., a first user)

and a user of another media content processing device 105 (e.g., a second user). For instance, the first user and the second user may be friends or family members living in the same or separate households. Moreover, the first and second users may have defined the nature of their relationship on a social network website such as Facebook®, Google+®, LinkedIn®, Twitter®, etc. Each media content processing device 105, as discussed below, may be configured to receive the first user's credentials to access the social network information and to determine the nature of the relationship between the first user and the second user based on the information on the social network website. For example, the social network information may define the first user and second user as friends, family members (e.g., spouses, parent and child, siblings, cousins, etc.), co-workers, acquaintances, etc., based on the social network information. That is, the media content processing device 105 may determine that the first and second users are "social network friends." Moreover, the media content processing device 105 may define the first user's social network friends as any member of a social network who has the same or similar interests as the first user, regardless of whether the first and second users have ever met in person. The media content processing device 105 may access the social network website to retrieve such social network information about the first and second users.

The content server 110 may include any number of devices configured to store media content and provide the media content to one or more media content processing devices 105 over, e.g., the communication network 125. For instance, the content server 110 may be configured to transmit television shows, movies, streaming video, streaming music, games, etc., to one or more media content processing devices 105 either when requested (e.g., on-demand or streaming) or on a subscription basis. In one possible approach, the content server 110 may be located at a content provider location 120.

The recommendation server 115 may include any device configured to collect the viewing data and social network information from each of the media content processing devices 105 and provide each media content processing device 105 with a viewing recommendation based at least in part on the viewing data and the social network relationship defined by the social network information. For instance, the recommendation server 115 may receive the viewing data and social network information from each media content processing device 105 via the communication network 125, identify the social network friends of a user of one of the media content processing devices 105, and output the viewing recommendation to that media content processing device 105 based on the viewing data associated with the user's social network friends. The viewing data, the social network information, and the viewing recommendation may be stored in any number of databases on the recommendation server 115. In one possible approach, the recommendation server 115 may be located at the content provider location 120.

In general, computing systems and/or devices, such as each media content processing device 105, the content server 110, and the recommendation server 115, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
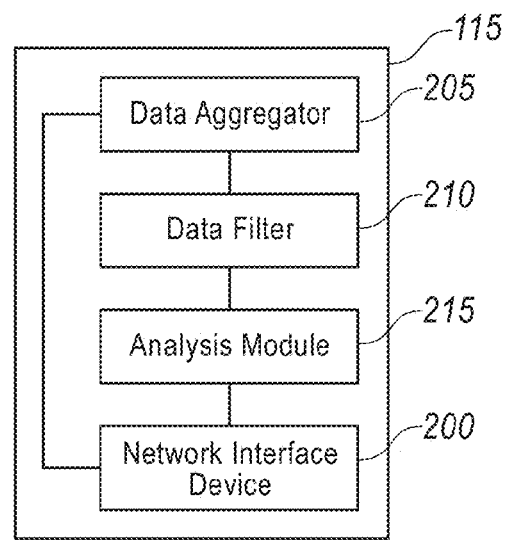
FIG. 2 is a block diagram of an example recommendation server.

FIG. 2 illustrates a block diagram of an example recommendation server 115. As shown, the recommendation server 115 may include a network interface device 200, a data aggregator 205, a data filter 210, and an analysis module 215.

The network interface device 200 may include any device configured to allow the recommendation server 115 to transmit and receive signals over the communication network 125. For instance, the network interface device 200 may include or allow the recommendation server 115 to connect to a router, an optical network terminal, etc. The network interface device 200 may include any device, therefore, configured to communicate over any type of computer or telecommunications networks, such as a packet-switched network, a cellular network, or a fiber optic network.

The data aggregator 205 may include hardware, software, or some combination thereof that is configured to receive signals from the media content processing devices 105 that are transmitted over the communication network 125. For instance, the data aggregator 205 may be in communication with the network interface device 200. Data, such as viewing data, social network information, or both, received by the network interface device 200 may be transmitted to the data aggregator 205. In one possible approach, the data aggregator 205 is configured to receive viewing data and social network information from each media content processing device 105 in the system 100. The data aggregator 205 may collect and store the received data in one or more databases.

The data filter 210 may include hardware, software, or both, in communication with the data aggregator 205. The data filter 210 may be configured to remove some of the viewing data or social network information based on various criteria. This way, unrelated viewing data may be removed, and thus, not considered when making a viewing recommendation. For example, the data filter 210 may remove viewing data that indicates that the user is flipping through channels.

The analysis module 215 may include any combination of hardware and software that is configured to analyze the viewing data and the social network information received at the recommendation server 115 to determine and output the viewing recommendation to one or more of the media content processing devices 105. In one possible approach, the analysis module 215 may, using the social network information, identify relationships between users of two or more of the media content processing devices 105 in the system 100. For example, the analysis module 215 may determine that a first user of one media content processing device 105 is a friend or family member of a second user of another media content processing device 105 based on the social network relationship between the first and second users as defined by the social network information.

The analysis module 215 may be configured to use the viewing data received from the media content processing devices 105 (e.g., source devices) to determine which television shows and movies the user of that source device likes or is currently watching. The analysis module 215 may use this viewing data to generate a viewing recommendation based on the viewing preferences of the user of each source device in the system 100. The analysis module 215 may, using the network interface device 320, transmit the viewing recommendation to a target device.

The viewing recommendation may present the television shows, movies, music, or any other media content that the users of the source devices like or are currently consuming. In one possible approach, the viewing recommendation may presents recommended media content from social network friends of the user of the target device. As discussed above, social network friends are those who have a social network relationship to the user of the target device.

In one example implementation, the analysis module 215 may generate and output a unique viewing recommendation for each target device in the system 100 based on the viewing data received and the social network relationship between the users of each source device and the target device. The analysis module 215 may be configured to ignore or remove viewing data received from non-source devices, e.g., devices associated with users who are not social network friends with the user of the target device. That is, the analysis module 215 may be configured to only consider a media content processing device 105 to be a source device relative to a specific target device if the users of the devices are social network friends. The analysis module 215 may exclude the viewing data from non-source devices using, e.g., the data filter 210.

Figure 3:
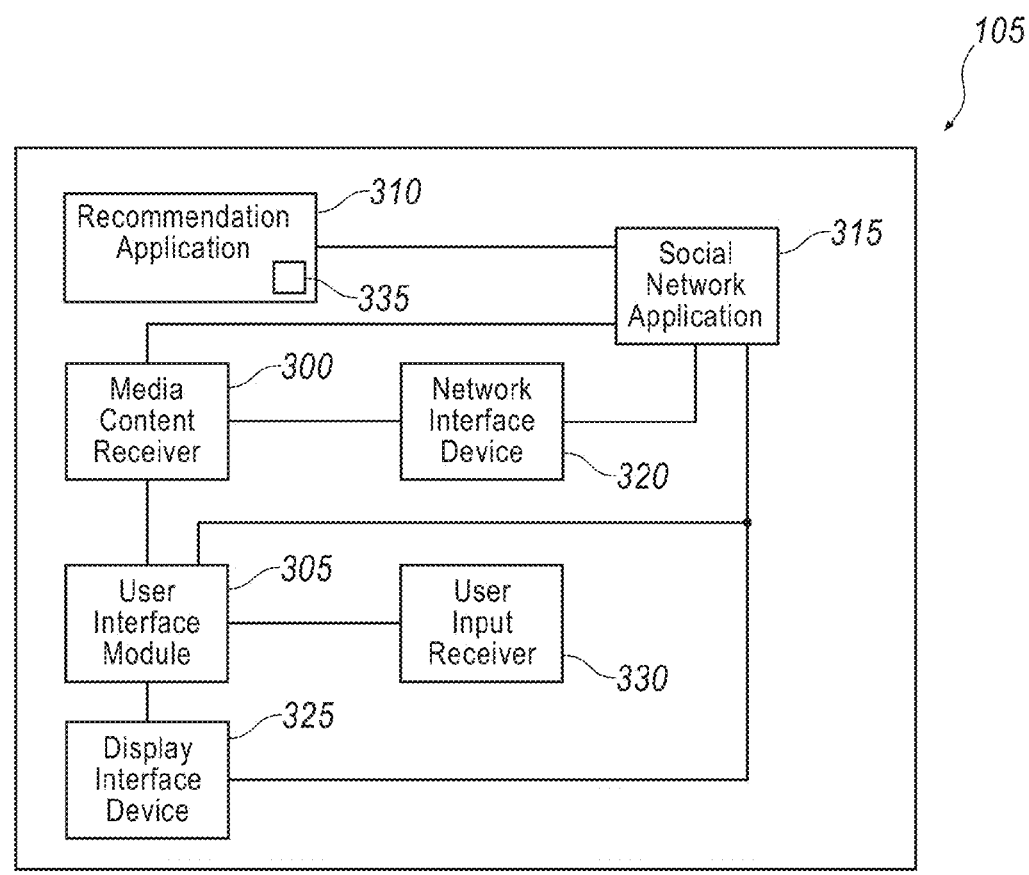
FIG. 3 is a block diagram of an example media content processing device.

FIG. 3 is a block diagram of an example media content processing device 105 that could be a source device or a target device. The media content processing device 105, as illustrated, includes a media content receiver 300, a user interface module 305, a recommendation application 310, and a social network application 315. The media content processing device 105 may further include a network interface device 320, which may be similar to the network interface device 200 discussed above with reference to FIG. 2.

The media content receiver 300 may include any combination of hardware, software, or both, that allows the media content processing device 105 to receive media content from one or more service providers. Accordingly, the media content receiver 300 may include an antenna configured to receive media content that is broadcast at particular frequencies, a tuner configured to receive media content broadcast over a cable network, a media application configured to receive streaming video or music, or a gaming application configured to present a video game to a user. The media content receiver 300 may transmit the media content to a display interface device 325 so that the media content may be displayed to a user.

The user interface module 305 may include any combination of hardware and software configured to present a graphical user interface to a user of the media content processing device 105. The user interface module 305, therefore, may present a menu of selectable media content or options. Moreover, the user interface module 305 may be configured to allow the user to customize the display of the presented information. For instance, using the user interface module 305, the user may sort the menus according to at least one criteria. In another example approach, the user interface module 305 may be configured to present a video or text chat to the user that is concurrently displayed with the media content, even if the user and the user's social network friends are consuming the media content on different types of devices. This way, the user may chat with the user's social network friends while the user is viewing the media content on, e.g., a television and the user's social network friend is simultaneously viewing the media content on, e.g., a tablet computer.

Additionally, the user interface module 305 may be configured to allow the user to consume media content on one media content processing device 105 and communicate with the user's social network friends using another media content processing device 105. For example, the user may view the media content on a television while engaged in a video chat, using another media content processing device 105, with a social network friend. In this instance, both media content processing devices 105 used by the user may be configured to communicate with one another through an application so that the user may seamlessly use both media content processing devices 105 while consuming the media content.

The user may interact with the user interface module 305 using an input device (not shown) connected to the media content processing device 105 via a user input receiver 330. The user input receiver 330 may include an infrared receiver configured to receive infrared signals from, e.g., a remote control or any other type of input receiver such as one configured to receive an input from a keyboard, a mouse, a touch screen, a track pad, a camera, a microphone, or the like. The received input may include one or more user input commands that may be used to control the graphical user interface. That is, the input commands may be used to display the graphical user interface, sort the information presented via the graphical user interface, select one or more selectable options, display media content, etc. Moreover, if the received input is from a camera or microphone, the received input may be transmitted to another media content processing device 105 during, e.g., a video or text chat.

The recommendation application 310 may include any hardware, software, or combination thereof configured to receive the viewing recommendation from the recommendation server 115 and output one or more viewing recommendations to the user via, e.g., the user interface module 305. In particular, the recommendation application 310 may be in communication with the network interface device 320 and may be configured to receive the viewing recommendation transmitted by the recommendation server 115 through the communication network 125. Additionally, the recommendation application 310 may be configured to output the received viewing recommendation to the user interface module 305 so that the viewing recommendation may be presented to the user.

In one possible approach, the recommendation application 310 may include a content filter 335 configured to only output predetermined subsets of the viewing recommendation in response to one or more criteria that may be selected by a user. For example, the content filter 335 may allow the recommendation application 310 to output viewing recommendations based on the viewing data received from source devices that are within the same geographic region as the target device. Alternatively, the content filter 335 may allow the recommendation application 310 to output viewing information based on the viewing data of the user of the target device's social network friends. Accordingly, the content filter 335 may be configured to output viewing data in accordance with one or more viewing criteria. The recommendation application 310 may be in communication with the user input receiver 330 and configured to receive one or more user input commands. This way, the user may select one or more of the viewing criteria using the user input commands.

The social network application 315 may be in communication with the network interface device 320 and may include any combination of hardware, software, or both, that is configured to retrieve social network information from a social network source, such as a server hosting a social network website. In one possible approach, the social network application 315 may include one or more application programming interfaces (API) to communicate with and receive information from the social network source. Further, the social network application 315 may use one or more APIs to upload social network information to one or more social network sources. The social network application 315, therefore, may be configured to determine the social network relationship between at least two media content processing devices 105. In addition, the social network application 315 may be configured to receive other information from the social network source. This other information may include content posted to a user's profile page, content directed at the user of the target device, etc.

Furthermore, the social network application 315 may be configured to define new social network relationships between users. That is, the user of the target media content processing device 105 may input information about a relationship with another user of another media content processing device 105. Alternatively, the social network application 315 may identify other users with similar tastes in media content and suggest that the user of the target media content processing device 105 establish a social network relationship with such other users. The social network application 315 may define the new social network relationship and transmit the new social network relationship to the social network source.

The social network application 315 may be configured to output the social network information, including defined social network relationships, to the recommendation application 310, to the social network source, or both. As previously discussed, the recommendation application 310 may use the social network information to filter the viewing recommendations presented to the user via the user interface module 305. That is, the recommendation application 310 may be configured to output a viewing recommendation based on the viewing data of other users who have a social network relationship with the user of the media content processing device 105. The social network application 315 may be configured to output viewing data to the social network source so, for instance, the user's social network friends may see what media content the user likes or is currently watching.

The social network application 315 may be further configured to output social network information to the media content receiver 300, the user interface module 305, or the display interface device 320. In one possible approach, the social network application 315 may output comments or status updates from other users to the media content receiver 300, the user interface module 305, or the display interface device 320 so that the social network information may be displayed concurrently with the media content. By way of example only, the social network information may include comments about the media content that the user is currently watching. The social network information may transmit the comments to the media content receiver 300, the user interface module 305, or the display interface device 315 so that the comments may be displayed with the media content. The comments may be overlaid on the media content or displayed just above, below, or next to the media content.

Figure 4:
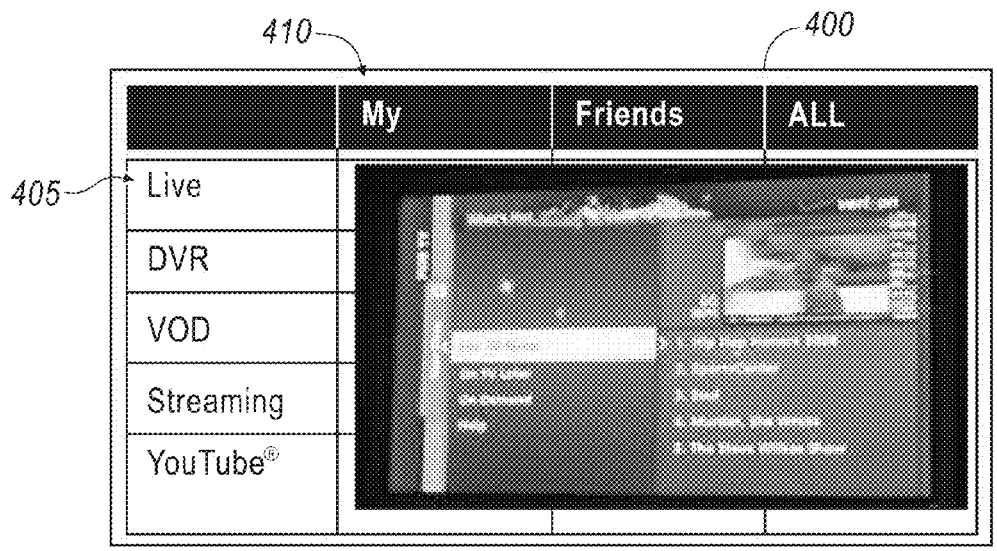
FIG. 4 illustrates an example graphical user interface that may be presented to a user of the media content processing device.

FIG. 4 illustrates an example graphical user interface 400 that may be presented to a user of the media content processing device 105. The graphical user interface may present media content options 405 and filter options 410 to the user. The media content options 405, in the example of FIG. 4, include live television, recorded television ("DVR"), video on-demand ("VOD"), streaming video or music, and streamlining video from a website, such as YouTube®. The filter options 410 may include a "My" option, which may represent the user's own viewing preferences, a "Friends" option which may represent the viewing preferences of the user's social network friends as defined by one or more social network relationships, and an "All" option, which may represent the viewing preferences of all media content processing device 105 users.

In one possible implementation, the media content processing device 105 may present the viewing recommendation in view of the selected media content options 405 and filter options 410. That is, the media content processing device 105 may present the media content options 405 and filter options 410 to the user using the user interface module 305 and the display interface device 325, and further, the media content processing device 105 may receive a selection from the user via the user input receiver 330. The user's selection of media content options 405 and filter options 410 may determine the viewing recommendation displayed to the user. For instance, if the user selects the media content option associated with live television and the "Friends" filter option, the media content processing device 105 may present the user with the viewing recommendation based on the user's friends' viewing data. Again, the user's friends may be defined by social network relationships according to the social network information received by the social network application 315.

Figure 5:
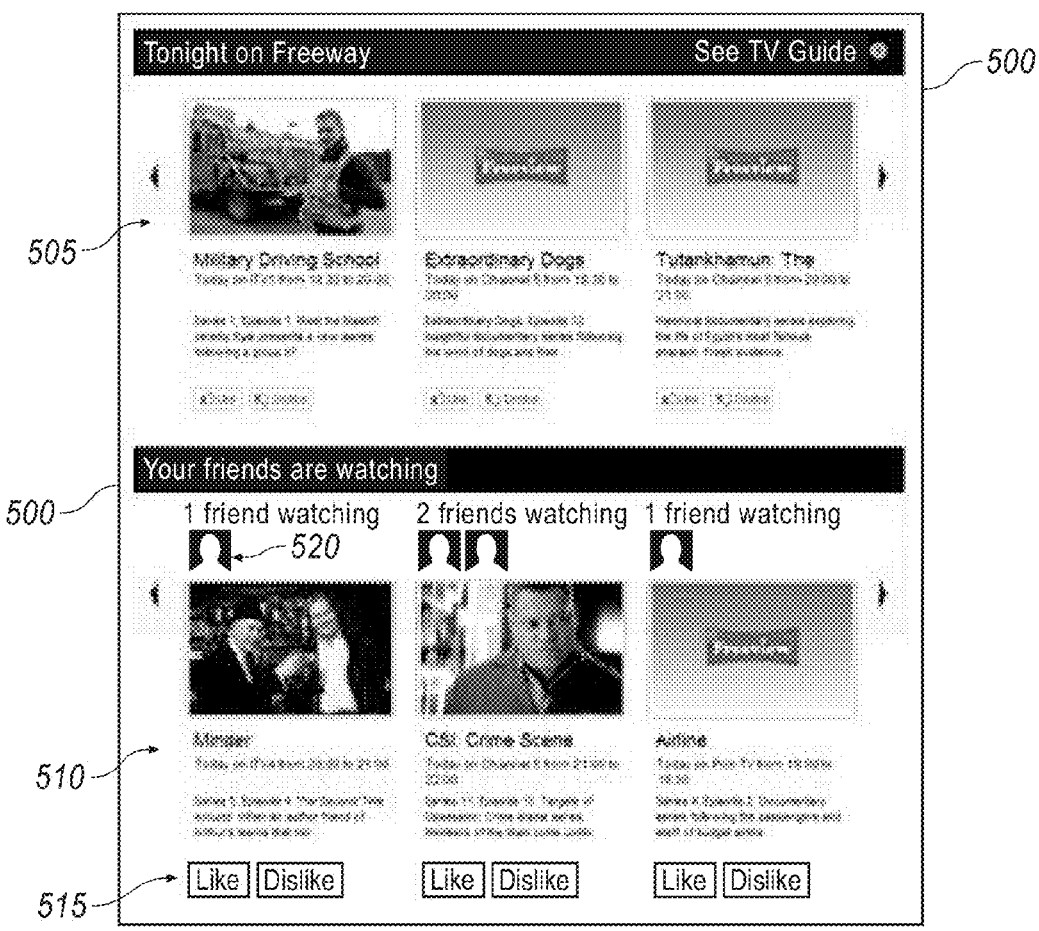
FIG. 5 illustrates another example graphical user interface that may be presented to the user of the media content processing device.

FIG. 5 illustrates another example graphical user interface 500 that may be presented to the user of the media content processing device 105. In this example approach, the graphical user interface 500 includes a first portion 505 that displays a viewing recommendation specific to the user based on, e.g., the user's own viewing data and a second portion 510 that displays a viewing recommendation based on the viewing data of the user's social network friends. The second portion 510 may further present the name or names of the social network friends who are watching a particular media content instance. The media content processing device 105 may be configured to receive an input command from the user that indicates that the user elects to watch one of the same media content instances as displayed in the first portion 505 or the second portion 510. Moreover, the graphical user interface 500 may present one or more feedback buttons 515 for the user to select his or her preference for the displayed media content. That is, using the feedback buttons 515, the user may indicate that he or she likes or dislikes one or more of the media content instances presented.

The graphical user interface 500 may further include a channel lock button 520 that, when pressed, may lock the display of the user's media content processing device 105 to that of one of the user's social network friends' media content processing devices 105. In the context of FIG. 5, the channel lock button 520 may be presented as an avatar associated with one of the user's social network friends who is currently watching a recommended media content instance. The user may select the avatar of that social network friend, and the media content processing device 105 may respond by locking the user's display to that of the social network friend so that both users will watch the same media content. In one possible approach, as the social network friend changes the media content displayed (e.g., changes the channel or selects recorded content to view), the media content displayed on both user's media content processing device 105 remains the same.

Figure 6:
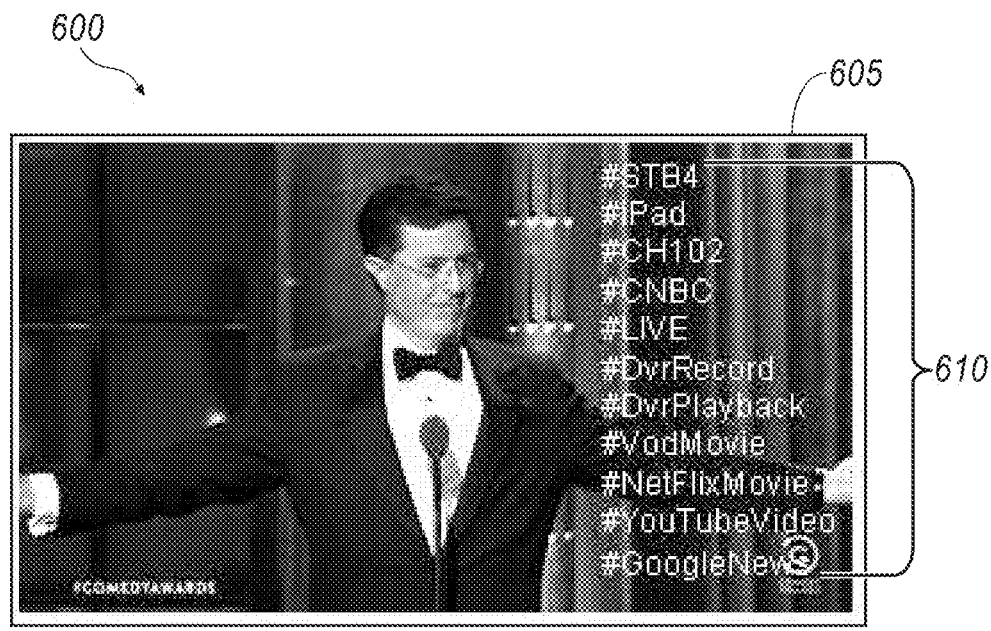
FIG. 6 is an example display having media content concurrently displayed with social network information.

FIG. 6 is an example display 600 having media content 605 concurrently displayed with social network information 610. In this example display, the social network information 610 is overlaid on the media content 605. As illustrated, the social network information 610 includes hash tags, e.g., a hash mark (#) followed by a term associated with the displayed media content 605. For example, one hash tag, "#DvrRecord," may indicate that one user is recording the media content 605 onto a DVR while another hash tag, "VodMovie," may indicate that another user requested the content via video on demand. Alternatively or in addition, the social network information 610 could include comments from the user's social network friends that are associated with the viewed media content 605. In one possible implementation, the social network information 610 may be presented with the media content 605 in real-time. That is, the social network information 610 may be updated as the user's social network friends submit new comments to the social network source while simultaneously watching the same media content 605. Alternatively, the social network application 315 may record social network information, such as comments or hash tags, from previously consumed media content. The social network information may, in one possible approach, be linked to a specific portion of the media content instance. Accordingly, as the user watches the media content at a later time, the media content processing device 105 may display the social network information 610 from the user's social network friends at the time of the media content 605 when the user's social network friend submitted the social network information 610. Therefore, the user may view a friend's comments about a particular scene in, e.g., a movie during that scene only, even if the user watches the media content 605 after the social network friend watched the media content 605.

Figure 7:
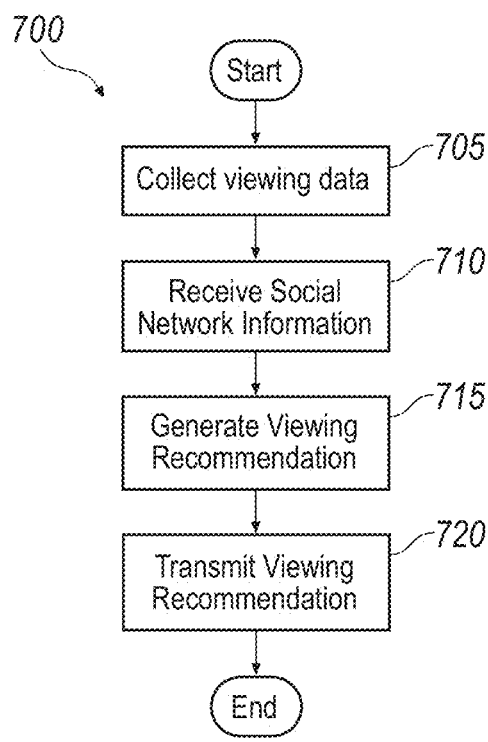
FIG. 7 is a flowchart of an example process that may be implemented by the recommendation server.

FIG. 7 is a flowchart of an example process 700 that may be implemented by the recommendation server 115.

At block 705, the recommendation server 115 may collect viewing data from a plurality of media content processing devices 105, such as at least one target device and multiple source devices. For instance, the recommendation server 115 may receive the viewing data over the communication network 125 using the network interface device 200.

At block 710, the recommendation server 115 may receive social media information from a social network source. That is, in one possible implementation, each source device may, using the social network application 315, retrieve social media information from the social network source. Each source device may further transmit the received social media information to the recommendation server 115. As discussed above, the social network information may define a social network relationship between the target device and the source device. For instance, the social network relationship may indicate that the user of the source device is social network friends with the user of the target device.

At block 715, the recommendation server 115 may generate the viewing recommendation for the target device based, at least in part, on the viewing data of one or more source devices and the social network information. For example, the recommendation server 115 may consider the viewing data received from media content processing devices 105 associated with users who have a social network relationship with the user of the target device and generate the viewing recommendation based on such viewing data.

At block 720, the recommendation server 115 may transmit the viewing recommendation to the target device where, e.g., the viewing recommendation may be presented to the user of the target device. As discussed above, the viewing recommendation may suggest media content that the user of the target device may enjoy based on the type of media content the user's social network friends enjoy or are currently watching.

The process 700 may end after block 720.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
    a plurality of media content processing devices having respective user interfaces and configured to receive media content from at least one content provider;
    at least one content server in communication with each of the media content processing devices and configured to provide the media content to each of the media content processing devices;
    at least one recommendation server in communication with each of the media content processing devices and configured to collect viewing data and social network information from each of the media content processing devices;
    wherein the recommendation server is configured to provide a viewing recommendation based at least in part on the viewing data for at least two of the plurality of media content processing devices that share social network information as social network friends;
    wherein the viewing recommendation presents social network information overlaid on media content currently being consumed by the plurality of media content processing devices;
    wherein at least one of the user interfaces presents an amount of social network friends that are watching a particular content instance; and
    wherein at least two of the user interfaces are locked to the same media content in response to selecting an avatar of at least one of the social network friends such that at least one of the user interfaces changes media content of another one of the user interfaces.

2. A system as set forth in claim 1, wherein each media content processing device includes at least one social network application configured to determine a social network relationship between at least two of the media content processing devices.

3. A system as set forth in claim 1, wherein each social network application is configured to define a new social network relationship between at least two media content processing devices based on media content received by the at least two media content processing devices.

4. A system as set forth in claim 1, wherein each media content processing device is configured to present social network information concurrently with the media content.

5. A system as set forth in claim 1, wherein each social network application is configured to retrieve the social network information from a social network source.

6. A system as set forth in claim 1, wherein each media content processing device includes a recommendation application configured to receive the viewing recommendation from the at least one recommendation server.

7. A system as set forth in claim 6, wherein the recommendation application includes a content filter configured to filter the viewing recommendation based on at least one of a plurality of viewing criteria.

8. A system as set forth in claim 1, wherein the at least one recommendation server includes a data aggregator in communication with each media content processing device and configured to collect the viewing data.

9. A system as set forth in claim 8, wherein the data aggregator is configured to receive social network information from each of the media content processing devices.

10. A system as set forth in claim 9, wherein the at least one recommendation server includes an analysis module configured to analyze the viewing data and the social network information and output the viewing recommendation.

11. A recommendation server comprising:
    a network interface device configured to communicate with a plurality of media content processing devices having respective user interfaces;
    a data aggregator in communication with the network interface device and configured to collect viewing data for at least two of the plurality of media content processing devices that share social network information as social network friends;
    an analysis module in communication with the data aggregator and the network interface device, wherein the analysis module is configured to:
    analyze the viewing data and the social network information,
    generating a viewing recommendation by filtering viewing data from media content processing devices based on lack of a social network relationship, and
    output the viewing recommendation to at least one of the plurality of media content processing devices, the viewing recommendation including a first portion based on the viewing data associated with the at least one of the plurality of media content processing devices and a second portion associated with the shared social network information;
    wherein the viewing recommendation presents social network information overlaid on media content currently being consumed by the plurality of media content processing devices;

wherein at least one of the user interfaces presents an amount of social network friends that are watching a particular content instance; and wherein at least two of the user interfaces are locked to the same media content in response to selecting an avatar of at least one of the social network friends such that at least one of the user interfaces changes media content of another one of the user interfaces.

12. A recommendation server as set forth in claim 11, further comprising a data filter in communication with the data aggregator and the analysis module, wherein the data filter is configured to filter the viewing data provided to the analysis module for the viewing recommendation.

13. A recommendation server as set forth in claim 11, wherein the network interface device is configured to communicate with the plurality of media content processing devices over a fiber optic communication network.

14. A media content processing device comprising:
a network interface device configured to communicate over a communication network;
a social network application in communication with the network interface device and configured to retrieve credentials of a first user to access social network information from a social network source over the communication network;
a user input receiver in communication with the network interface device and configured to receive user input commands including search queries entered by the user and transmit the received user input commands to a recommendation server over the communication network;
a recommendation application in communication with the network device and configured to receive a viewing recommendation from the recommendation server, wherein the viewing recommendation is based at least in part on viewing data for at least two media content processing devices having respective user interfaces and that share social network information as social network friends;
wherein the viewing recommendation presents social network information overlaid on media content currently being consumed by the plurality of media content processing devices;
wherein at least one of the user interfaces presents an amount of social network friends that are watching a particular content instance; and
wherein at least two of the user interfaces are locked to the same media content in response to selecting an avatar of at least one of the social network friends such that at least one of the user interfaces changes media content of another one of the user interfaces.

15. A media content processing device as set forth in claim 14, further comprising a media content receiver in communication with the network interface device and configured to receive media content over the communication network.

16. A media content processing device as set forth in claim 14, wherein the recommendation application includes a content filter configured to filter the viewing recommendation based on at least one of a plurality of viewing criteria.

17. A media content processing device as set forth in claim 14, further comprising a user interface module in communication with the recommendation application, wherein the user interface module is configured to present a graphical user interface to the user that includes the viewing recommendation.

18. A method comprising:
collecting, at a computing device, viewing data from a plurality of media content processing devices including a target device and a source device having respective user interfaces;
receiving, at the computing device, social media information from a social network source;
identifying, based on the social network information, a social network relationship including the target device and the source device;
generating, at the computing device, a viewing recommendation for the target device based at least in part on the viewing data for at least two media content processing devices that share social network information as social network friends, the viewing recommendation presenting social network information overlaid on media content currently being consumed by the plurality of media content processing devices;
presenting an amount of social network friends that are watching a particular content instance; and
locking at least two of the user interfaces to the same media content in response to selecting an avatar of at least one of the social network friend such that at least one of the user interfaces changes media content of another one of the user interfaces.

19. A method as set forth in claim 18, wherein the social network information indicates that a user of the target device is social network friends with a user of the source device.

20. A method as set forth in claim 18, further comprising transmitting the viewing recommendation to the target device.

* * * * *